July 16, 1929.  W. MÖLLER ET AL  1,720,965
PREPARATION OF SOLUTIONS OF HYDROFLUOSILICIC ACID
Filed Dec. 22, 1926
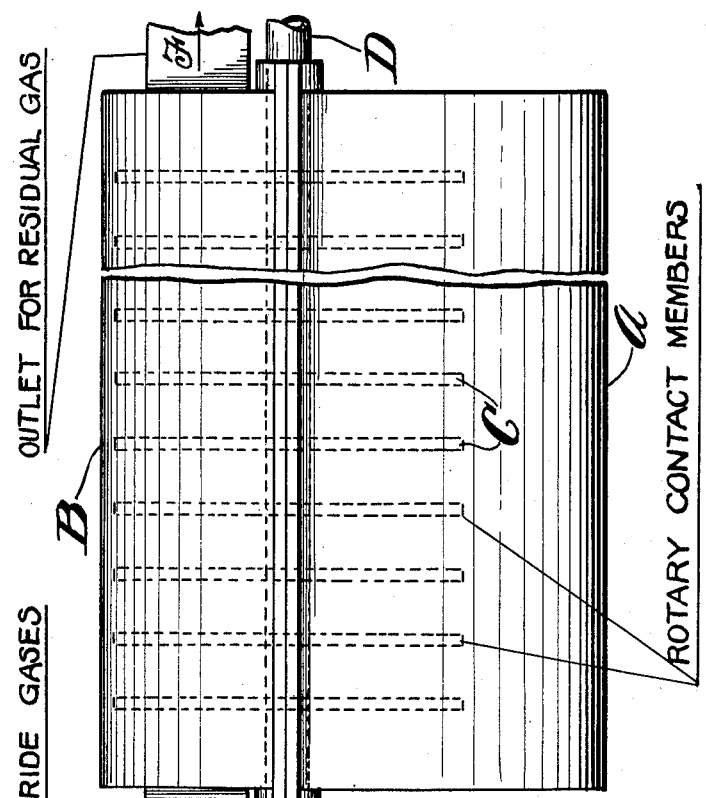
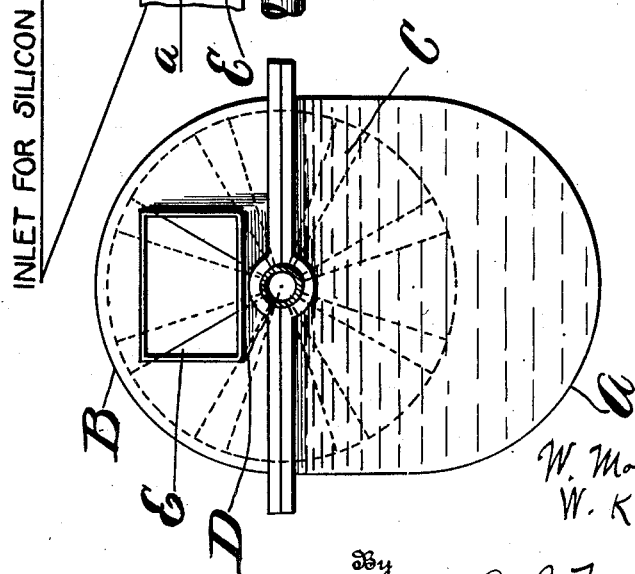

Patented July 16, 1929.

1,720,965

UNITED STATES PATENT OFFICE.

WILHELM MÖLLER, OF WENTORF-REINBEK B/HAMBURG, AND WILHELM KRETH, OF HAMBURG, GERMANY.

PREPARATION OF SOLUTIONS OF HYDROFLUOSILICIC ACID.

Application filed December 22, 1926, Serial No. 156,512, and in Germany December 23, 1925.

This invention relates to the manufacture of a highly concentrated solution of hydrofluosilicic acid. Hydrofluosilicic acid is already manufactured on an industrial scale by generating silicon fluoride from a mixture of sand and fluor spar by the action of sulphuric acid, and by bringing this silicon fluoride in contact with water, various apparatus having already been proposed for carrying out this complete reaction without cessation. As is well known, it is impossible to work in practice by introducing silicon fluoride directly into water, as in such a case the admission pipe is easily liable to be choked by the colloidal silicic acid separated.

It has been also attempted to meet these difficulties by bringing gases containing siliconfluoride, in contact with atomized water or steam. Finally, thin water mist was produced by means of rotating discs, and the silicon fluoride was passed through it. All these processes for the decomposition of silicon fluoride fail, owing to the reaction between silicon fluoride and water not being instantaneous, but taking some time, which is probably due to the formation of colloidal silicic acid, and also owing to the colloidal silicic acid which settles on the parts of the apparatus, being a very inconvenient addition to the aqueous solution of hydrofluosilicic acid produced.

In addition to the above, the reaction between water and silicon fluoride takes place at the ordinary temperature. Contrary to published statements, it ceases at a higher temperature. This behaviour explains the fact that silicon fluoride escapes with the other gases from the opening-up vessel of the superphosphate factories, in spite of the presence of considerable quantities of steam. This observation has been, moreover, confirmed by the applicants who found that when water trickling towers were used for the manufacture of hydrofluosilicic acid, the reaction in the first tower continued only as long as it was still cold, and ceased as soon as the tower was heated by the hot gases to a certain extent. The reaction then took place in the second tower until it also became too hot, and so on. But the silicon fluoride-containing gases which are used for the absorption and for the reaction, are always of a fairly high temperature, whether they be waste gases from the opening up of superphosphate vessel, or whether they be obtained directly from a prepared mixture of fluor spar, sand and sulphuric acid.

The applicants have discovered that the most suitable apparatus or installations for obtaining really high concentrations of hydrofluosilicic acid, are those in which the gas is caused to pass along surfaces coated with thin layers of water, which are of such a nature that they are always kept free from the silicic acid separated, and therefore always act as heat discharging surfaces. Such apparatus which are suitable for the purpose, are for instance the apparatus used for gas washing and the like, which comprise substantially a closed tube and a spindle provided with discs and rotating in the said tube, the discs of which dip with their lower part into the aqueous liquid which is to absorb the hydrofluosilicic acid. The slowly rotating discs which as far as possible fill up the whole liquid-free cross section of the tube, by means of their wet surface, give the silicon fluoride an opportunity, and also sufficient time, for the reaction, and the silicic acid separated during this time, is washed away from the dipping disc half, so that the portion emerging again from the liquid, is free from silicic acid, and offers a fresh reaction surface to the silicon fluoride.

It is preferable to proceed by connecting to the lower face of the tube a large tank in open communication with it, in order to give the silicic acid which represents a considerable volume, an opportunity to settle in a space free from movements of liquid. Several such decomposition units for the reaction between water and silicon fluoride may preferably be used simultaneously with the necessary change-over parts in order to enable them to be placed in or out of position in any desired sequence, according to requirements. Such an installation may preferably be provided with filter devices, in order first to separate the formed dilute solutions of hydrofluosilicic acid from the silicic acid separated, and to use these solutions again as aqueous liquid for the decomposition of further quantities of silicon fluoride.

Such an installation for the decomposition of silicon flouride by water, complies with the three necessary conditions, i. e. of constantly keeping cool the reaction surfaces, and of giving the reaction surfaces the form of surfaces provided with a thin water coating, and finally of keeping the reaction surfaces free from separated silicic acid.

The single discs may be of different character. They may be in vertical position relatively to the axis of rotation, and provided with slots. They may be constituted also, in order to avoid an unnecessary increase of the passage resistance of the material to be treated, by several portions obliquely mounted on the spindle like fan blades, and these portions may further be bent or curved. The essential point is that large moist surfaces should be provided in order to carry the reaction, which takes time, through to the end.

An example of an apparatus which may be used to practice the present invention is illustrated in the drawings in which Fig. 1 is an end view at the left of Fig. 2, looking in the direction of the arrow, and Fig. 2 is a side view. The apparatus comprises a fluid container A, the enclosing cover B, the horizontal rotatable shaft D and the discs C attached to the shaft D. The discs may be of any desired form as explained above. The inlet for the silicon fluoride containing gases is indicated at E, and the outlet for the residual gases at F. The fluid in the container A extends to the discs D so that their parts or wings will be moistened as they rotate with the shaft D.

Having described our invention, we claim:—

1. The process of producing hydrofluosilicic acid which comprises contacting silicon fluoride with the surface of a thin film of an aqueous medium, thereafter replacing said film by another aqueous film capable of further reacting with silicon fluoride, and repeating the aforesaid surface contact.

2. The process of producing hydrofluosilicic acid which comprises contacting silicon fluoride with a surface containing a thin film of water, removing said film after reaction with the silicon fluoride, replacing it by means of another film and repeating the aforesaid contact.

3. The process of producing hydrofluosilicic acid which comprises contacting silicon fluoride with surfaces coated with thin layers of an aqueous medium and thereafter washing away the silicic acid and hydrofluosilicic acid formed during such contact by means of an aqueous medium and thereby simultaneously renewing said aqueous layers.

4. The process of producing hydrofluosilicic acid which comprises producing a thin film from a portion of a body of water, bringing silicon fluoride in surface contact with said film, replacing said film by another formed from another portion of said water, adding the preceding film to said body of water and continuing this operation until the desired concentration of hydrofluosilicic acid is attained.

5. The process of producing hydrofluosilicic acid which comprises contacting silicon fluoride with a surface wetted with an aqueous medium, removing reaction products from said surface and wetting said surface anew for further contact with silicon fluoride.

6. The process of producing hydrofluosilicic acid which comprises contacting silicon fluoride with a surface wetted with water, thereby producing silicic acid and hydrofluosilicic acid, removing the silicic acid and hydrofluosilicic acid so formed, wetting the said surface again and continuing the wetting and removal until the desired amount of hydrofluosilicic acid is produced.

7. The process of producing hydrofluosilicic acid which comprises bringing silicon fluoride and water into chemical reactive relationship and maintaining the reacting substances throughout the process at substantially ordinary temperature to promote the formation of the hydrofluosilicic acid.

In testimony whereof we have signed our names to this specification.

WILHELM MÖLLER.
WILHELM KRETH.